United States Patent [19]

Weinberger

[11] Patent Number: 4,964,445

[45] Date of Patent: Oct. 23, 1990

[54] APPARATUS FOR FILLING A LIQUID FRICTION COUPLING

[75] Inventor: Gottfried Weinberger, Graz, Austria

[73] Assignee: Steyr-Daimler-Puch AG, Vienna, Austria

[21] Appl. No.: 376,637

[22] Filed: Jul. 6, 1989

[30] Foreign Application Priority Data

Jul. 20, 1988 [AT] Austria ................................ 1861/88

[51] Int. Cl.$^5$ .............................................. B65B 3/00
[52] U.S. Cl. .................................... 141/346; 141/302; 141/54; 137/596; 91/432
[58] Field of Search ..................... 141/51, 54, 55, 285, 141/301, 302, 346, 347; 137/596; 91/432; 417/302, 305

[56] References Cited

U.S. PATENT DOCUMENTS

| | | | |
|---|---|---|---|
| 2,627,815 | 2/1953 | Bunting | 417/305 |
| 3,012,402 | 12/1961 | Westcott, Jr. | 91/432 |
| 3,148,714 | 9/1964 | Hillier | 141/347 |
| 3,313,326 | 4/1967 | Pellerino | 141/50 |
| 3,776,272 | 12/1973 | Arbon | 137/596 |
| 3,819,303 | 6/1974 | Pfleyer | 417/305 |
| 3,985,166 | 10/1976 | Klee | 141/346 |
| 4,017,221 | 4/1977 | Dezelan | 417/305 |
| 4,662,825 | 5/1987 | Djordjevic | 417/302 |
| 4,697,621 | 10/1987 | Diessner et al. | 141/83 |
| 4,758,131 | 7/1988 | Gurney | 417/305 |

FOREIGN PATENT DOCUMENTS 3618207 12/1986 Fed. Rep. of Germany .

*Primary Examiner*—Henry J. Recla
*Assistant Examiner*—Edward C. Donovan
*Attorney, Agent, or Firm*—Marmorek, Guttman & Rubenstein

[57] ABSTRACT

An apparatus for filling a liquid friction pump with a liquid comprises a metering pump and plug connector means for connection to the liquid friction coupling. During a testing of the filling ratio of the liquid friction pump it may be necessary not only to supply viscous liquid to said coupling but also to withdraw viscous liquid from such coupling. For that purpose the plug connector means are preceded by a manifold, which communicates with two nonreturn valves, which normally prevent a flow of liquid from said manifold through said valves. A discharge line from the metering pump communicates with a first of said nonreturn valves. The second nonreturn valve is incorporated in a return line leading from said manifold to a reservoir, from which the metering pump is adapted to suck liquid. Said second nonreturn valve is adapted to be opened preferably by the application of pneumatic pressure for a flow in said return line from said manifold through said second valve to said reservoir.

4 Claims, 1 Drawing Sheet

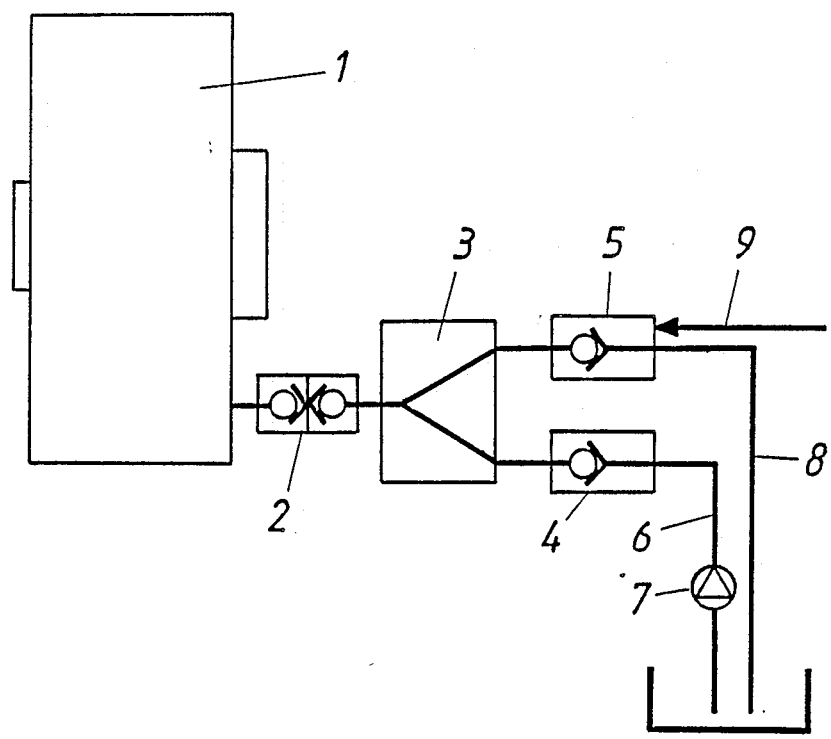

APPARATUS FOR FILLING A LIQUID FRICTION COUPLING

BACKGROUND OF THE INVENTION

1. Field of the Invention

This invention relates to an apparatus for filling a liquid friction coupling with a viscous liquid, which apparatus comprises a metering pump and plug connector means for connection to the liquid friction coupling.

2. Description of the Prior Art

The operating characteristics of a liquid friction coupling can be selected for a given viscous liquid employed in the coupling by a control of the filling ratio of the coupling. But difficulties are involved in an accurate adjustment of the filling ratio of the housing of the coupling. These difficulties arising in the control of the filling ratio are due to the fact that manufacturing tolerances of the several components of the coupling may have the result that the volume of the interior space of the coupling differs from the specified volume. Said difference may amount to a multiple of the permissible variation of the filling ratio.

An apparatus of the kind described first hereinbefore is known from Published German Application 36 18 207. But when the liquid friction coupling is in operation that known apparatus can be used only to supply working liquid in small amounts to the liquid friction coupling which is to be tested. Because an overfilling may also occur, it should be possible also to drain liquid because the filling operation would otherwise be unduly complicated.

SUMMARY OF THE INVENTION

For this reason it is an object of the invention so to improve the apparatus described hereinbefore with simple means that viscous liquid can be supplied to and drained from a liquid friction coupling during a trial operation thereof.

That object is accomplished in accordance with the invention in that a manifold communicating with two nonreturn valves precedes the plug coupling, the discharge line from the metering pump is connected to one of said nonreturn valves and the other nonreturn valve is incorporated in a return line and is adapted to be opened, preferably by pneumatic control.

The metering pump of such apparatus may be operated to supply liquid into the housing of the liquid friction coupling to be tested and liquid can be drained from said housing when the second non-return valve has been opened. Said operations may be fully automatically controlled by suitable control means. The temperature-torque curve can be used to determine the filling ratio.

BRIEF DESCRIPTION OF THE DRAWING

The drawing is a diagrammatic representation of an illustrative embodiment of an apparatus in accordance with the invention for filling a liquid friction pump.

DETAILED DESCRIPTION OF THE PREFERRED EMBODIMENT

The liquid friction coupling 1 is provided with one part of a plug connector 2, by which the liquid friction coupling 1 is automatically sealed when the two parts of the plug connector are separated from each other. The plug connector 2 is preceded by a manifold 3, which contains a junction that communicates with first and second nonreturn valves 4 and 5, each of which normally prevent a flow of liquid from the junction through said valve. A metering pump 7 is provided. A discharge line 6 leads from said metering pump 7 to the manifold 3 and incorporates the first nonreturn valve 4. The second nonreturn valve 5 is incorporated in a return line 8, which leads from the manifold 3 to a reservoir, from which the metering pump 7 is adapted to suck viscous liquid. By the application of pneumatic pressure via a line 9 to the nonreturn valve 5, the latter can be opened for a flow from the manifold 3 to the reservoir.

I claim:

1. An apparatus for supplying viscous liquid to a liquid friction coupling, comprising
    plug connector means adapted to be connected to said liquid friction coupling,
    a metering pump for supplying said viscous liquid to said liquid friction coupling,
    a discharge line connecting said metering pump to said plug connector means,
    a return line connected to said plug connector means,
    a junction through which said discharge line, said return line, and said plug connector means communicate with each other,
    first non-return valve means disposed in said discharge line for supplying said viscous liquid to said liquid friction coupling,
    second non-return valve means disposed in said return line for removing excess viscous liquid from said liquid friction coupling,
    said first and second non-return valve means being configured to operate normally in the same direction so that said first non-return valve means has a direction of flow from said discharge line to said junction and said second non-return valve means has a normal direction of flow from said return line to said junction,
    each of said first and second non-return valve means normally preventing a flow of liquid from said junction through said non-return valve means, and
    valve-controlling means for opening said second non-return valve means opposite to its normal direction of flow thereby to permit liquid to flow from said junction through said second non-return valve means and into said return line.

2. The apparatus of claim 1 wherein
    said junction is provided in a manifold, and
    said discharge line and said return line are connected to said manifold.

3. The apparatus set forth in claim 2 wherein
    said valve-controlling means comprise pneumatic pressure means for applying pneumatic pressure to said second non-return valve means thereby to open said second non-return valve means opposite to its normal direction of flow to permit liquid to flow from said junction through said second non-return valve means and into said return line.

4. The apparatus of claim 1, further comprising
    a reservoir for said viscous liquid, wherein said metering pump operates to suck viscous liquid from said reservoir and to discharge viscous liquid through said discharge line, and
    said return line communicates with said reservoir on that side of said second non-return valve means which is opposite to said junction.

* * * * *